United States Patent
Sydow et al.

[11] Patent Number: 5,961,764
[45] Date of Patent: Oct. 5, 1999

[54] REVERSE BUILDING PROCESS FOR THE MANUFACTURE OF COMPLEX-SHAPED VEHICLE FUEL TANKS USING SELF-SEALING, CURABLE MATERIALS

[75] Inventors: Daniel C. Sydow, Rome; Randall D. Fotinakes, Marietta, both of Ga.

[73] Assignee: Engineered Fabrics Corp., Rockmart, Ga.

[21] Appl. No.: 08/740,373

[22] Filed: Oct. 29, 1996

Related U.S. Application Data

[60] Provisional application No. 60/006,146, Nov. 2, 1995.

[51] Int. Cl.$^6$ ............... B29C 51/14; C09J 5/04; B32B 31/12
[52] U.S. Cl. ............ 156/242; 156/245; 156/307.3; 156/307.7; 264/516; 264/545; 264/546; 264/552; 264/553; 264/258
[58] Field of Search .................. 264/516, 545, 264/546, 552, 553, 258; 156/242, 245, 307.3, 307.7

[56] References Cited

U.S. PATENT DOCUMENTS

| | | | |
|---|---|---|---|
| 2,394,492 | 2/1946 | Scharenberg | 18/45 |
| 2,558,807 | 7/1951 | Bailey | 154/83 |
| 3,509,016 | 4/1970 | Underwood et al. | 161/190 |
| 3,567,536 | 3/1971 | Wickersham | 428/911 |
| 4,050,358 | 9/1977 | Humberstone et al. | 264/258 |
| 4,125,526 | 11/1978 | McCready | 264/552 |
| 4,434,021 | 2/1984 | Robinson et al. | 156/242 |
| 4,622,091 | 11/1986 | Letterman | 264/258 |
| 5,116,216 | 5/1992 | Cochran et al. | 264/553 |
| 5,122,318 | 6/1992 | Bonet et al. | 264/553 |
| 5,242,651 | 9/1993 | Brayden et al. | 264/516 |
| 5,366,684 | 11/1994 | Corneau, Jr. | 264/258 |
| 5,499,743 | 3/1996 | Blumenkron | 222/107 |

*Primary Examiner*—Jan H. Silbaugh
*Assistant Examiner*—Robin S. Gray
*Attorney, Agent, or Firm*—Renner, Kenner, Greive, Bobak, Taylor & Weber

[57] ABSTRACT

A manufacturing process for reverse building complex-shaped vehicle fuel tanks using complementary female mold half sections which, when joined together about their mating peripheral edges, exactly duplicate the fuel cavity framework of the vehicle into which the completed tanks are to be mounted. Whereas previous reverse building processes employed light weight, air-curable, non-tear fabric such as nylon fabric reinforcement to both halves of the female molds, such fabric is applied only to the mold for the top half of the fuel tank of the present invention. Self-sealing, autoclave curable materials are used in the bottom half of the fuel tank, thereby providing improved ballistic protection to the lower portion of the tank.

24 Claims, 2 Drawing Sheets

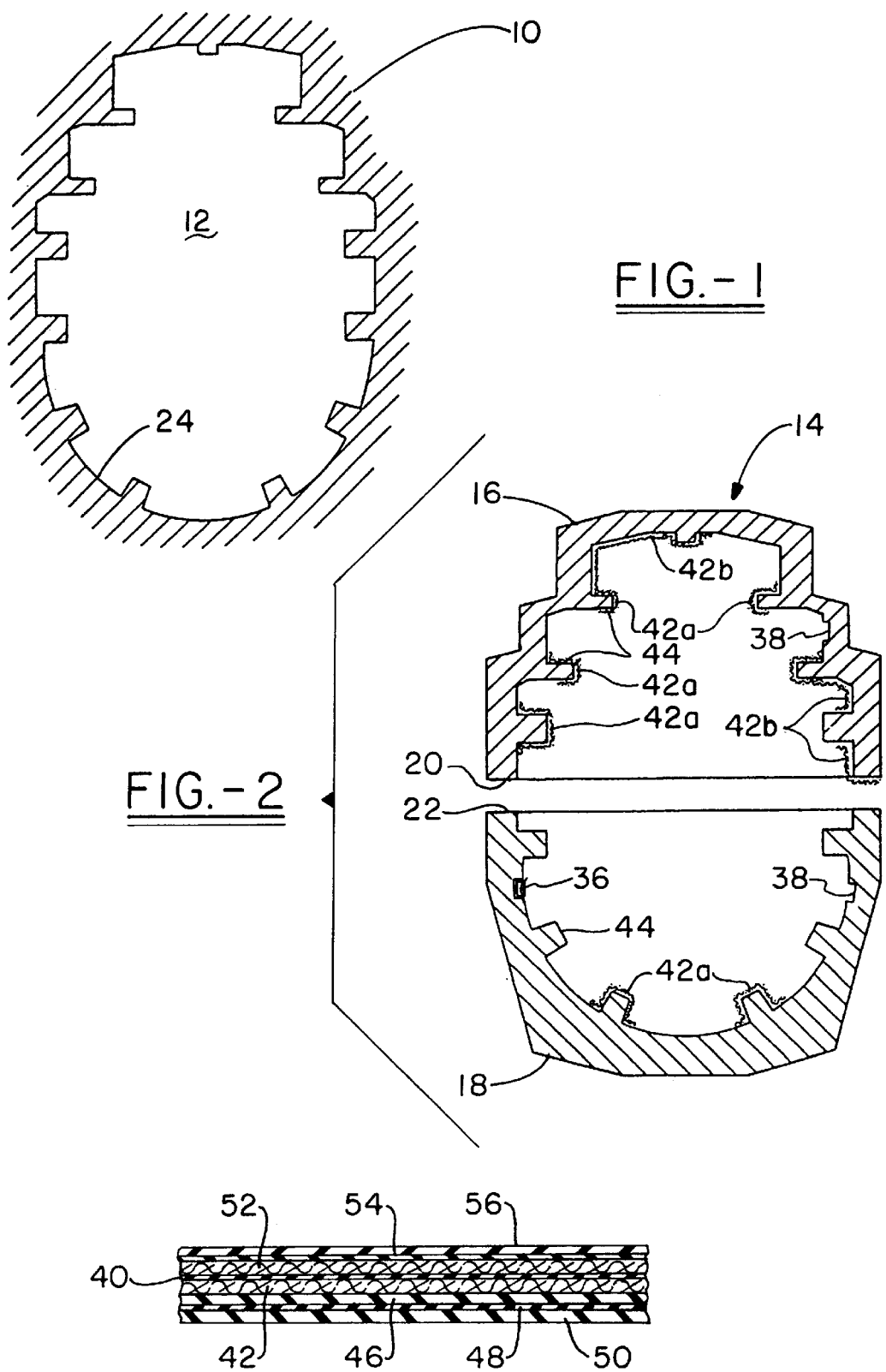

REVERSE BUILDING PROCESS FOR THE MANUFACTURE OF COMPLEX-SHAPED VEHICLE FUEL TANKS USING SELF-SEALING, CURABLE MATERIALS

CROSS-REFERENCE TO RELATED APPLICATION

This application claims the benefit of U.S. Provisional Application No. 60/006,146 filed Nov. 2, 1995.

TECHNICAL FIELD

The invention herein generally relates to a manufacturing process for making elastomeric fuel tanks. More particularly, the invention relates to the manufacture of complex-shaped tanks of the type which are installed within a complex-shaped cavity of the body framework of a vehicle such as, for example, an aircraft. Specifically, the invention relates to a manufacturing process for making light weight, fabric-reinforced, elastomeric fuel tanks which uses self-sealing and autoclave curable materials for at least a portion of the tanks.

BACKGROUND OF THE INVENTION

Fuel tanks of the type which are installed in the body framework or cavity of vehicles, and particularly, those which are made for aircraft installation, have been made for many years by a labor-intensive, inside-to-outside layup process. According to one of these prior art processes, a plaster/wood-wool mixture is formulated and applied to a mold fixture having the approximate configuration of the body framework cavity into which the fuel tank is to be installed. The fixture, however, is made undersized by an amount equal to the wall thickness of the finished tank. The plaster is cured for approximately 48 hours and removed from the fixture and the resultant male plaster form is used for lay-up of the fuel tank structure. Accordingly, because it is a male form, the first ply of material applied to the plaster form will constitute the interior facing of the finished tank. Therefore, to eliminate any possible discontinuities in the composite structure which may compromise the leak-proof integrity of the tank, the plaster form must be made as smooth as possible. Consequently, the plaster is hand-sanded to a smooth finish and then the various fittings which are required for the finished tank are mounted thereon. Finally, the materials forming the composite of the tank wall structure are applied to the plaster form and cured into an integral structure. Upon completion of the cure, the plaster form must be removed from the inside of the tank. This is accomplished by soaking the plaster in hot water, breaking it up into small pieces, and washing it out of the tank through one or more of the access fittings provided in the tank wall. Obviously, it is extremely important that all of the plaster is removed from the interior of the tank or contamination of the fuel will result.

Exemplary of the prior art pertaining to fuel tank manufacturing and the use of male forms are U.S. patents to Scharenberg (U.S. Pat. No. 2,394,492); Bell (U.S. Pat. No. 2,394,423); Noyes et al. (U.S. Pat. No. 2,890,489; and Bailey (U.S. Pat. No. 2,558,807).

While the described prior art process and the techniques of the above-referenced prior art patents have been used successfully for many years, the primary disadvantage centers upon the use of the male form. Because the male form is destroyed in the process of removing it from the interior of the tank, a new form is required for each and every tank made. Thus, the costs attendant to the making of these type of complex-shaped fuel tanks have risen dramatically because of the labor intensive nature of a process requiring hand-made male forms.

Furthermore, and because the composite forming the tank wall structure is laid up on the male form, it must be applied to a plurality of recesses which form the complex shape of the plaster mold. Irrespective of whether the composite is laid up by spraying or by hand application techniques, the recesses are critical areas of the tank structure and careful attention must be paid when applying the composite materials to these areas.

In view of the aforementioned disadvantages of the prior art tank manufacturing process which employs the use of male forms, reverse building processes using reverse build (female) molds have become more common. The reverse building process permits one to build more complex-shaped fuel tanks much more readily and easily than the aforementioned process. This reverse building process also eliminates some common installation problems when mounting the fuel tank in the complex-shaped vehicle cavity. For example, fittings can be more accurately located in the fuel tanks than was previously done when male forms were used.

Heretofore, the reverse building process for the manufacture of complex-shaped, fabric-reinforced, elastomeric fuel tanks has been typically accomplished by the method provided in Robinson et al. U.S. Pat. No. 4,434,021. Such a process uses complementary female mold half sections which, when joined together about their mating peripheral edges, exactly duplicate the geometry of the body framework cavity of the vehicle into which they are to be mounted. After applying a ply of release material to the mold sections and installing tank fittings where needed, plies of urethane elastomer may be spray-coated into the molds and nylon fabric reinforcement may be applied in two steps. The nylon fabric reinforcement may then be spray coated with another layer of urethane elastomer and a barrier system is then applied. The composite structure is again spray coated with more urethane elastomer to complete the composite which forms the tank structure. Upon completion of forming of the composite, the tank mold halves are joined by clamping them together, and a splice is completed from the inside of the tank by laying in reinforcement fabric at the butt joined sections of the composite and sealing it with urethane elastomer. Finally, the resulting fuel tank is allowed to cure into an integral structure and is removed from the molds to be positioned into the vehicle body cavity.

Such fuel tanks built in reverse order (outside-to-inside) may be advantageously lighter in weight than those built using male forms. This is because light weight materials which are known to be more conformal and flexible than those materials typically used in the process utilizing the male form, can be used in forming the complex-shaped fuel tanks. A light weight fuel tank is highly desirable for many vehicles such as aircraft, where weight continually presents problems in the design and use of such vehicles.

However, there remains disadvantages associated with the use of these light weight materials, such as the nylon fabrics disclosed above, in the production of the complex-shaped fuel tanks. For example, unlike the materials which may be used in forming complex-shaped fuel tanks using the male forms, the light weight materials are not self-sealing, meaning that upon being penetrated by a object such as a bullet from an anti-aircraft gun in the case of a fighter aircraft, the fuel tank may begin to leak fuel through the hole left by the bullet in the material, instead of sealing or, at the least, reducing the size of the hole through which fuel may flow out of the tank. While the light weight fuel tanks may include tear-resistant fabrics, meaning that upon penetration of the object, the hole left by the object should not increase significantly in size due to tearing of the fabric, this fabric does not prevent fuel from leaking from the fuel tank which could ultimately create a potentially dangerous or otherwise hazardous situation to the operator of the vehicle, such as the pilot of a fighter aircraft.

There are also disadvantages to the particular reverse build process disclosed in Robinson et al. U.S. Pat. No. 4,434,021. For instance, because of the way in which the fuel tanks are manufactured, the materials used are not autoclave curable. As noted in Robinson et al. U.S. Pat. No. 4,434,021, the two halves of the tank structure are joined together while still within the female mold sections to form the complete tank structure, the butt joined ends of the halves being spliced together and sealed. Only after the butt ends have been joined and the entire tank air cured (for at least approximately 24 hours) are the female mold sections removed. By that time, the tank structure has become one integral unit.

In order to cure materials in an autoclave or other heating apparatus where female molds are used, it is necessary to provide pressure to the inside of the molded part. However, because the female mold sections are joined prior to curing, as in Robinson et al. U.S. Pat. No. 4,434,021, it is extremely and prohibitively expensive, if not impossible, to provide the necessary pressure to the inside of the completed integral tank. In other words, because of the manufacturer's inability to provide sufficient pressure on the inside of the composite tank structure, autoclave or oven curing is not practical for the materials employed in the complex-shaped fuel tanks which are built using the reverse build process.

Accordingly, the light weight materials and, for that matter, any materials employed, must be cured at ambient (or slightly higher) temperature and at normal air pressure over a significantly longer period of time than would materials used with the male forms. While it should be clear that there are many advantages to using a reverse build process and light weight materials in that process, disadvantages associated with the use of these materials (not self-sealing) and the process as heretofore known (incapable of autoclave curing) reduce the desirability for the product and add significantly to the amount of time required to manufacture the fuel tank which, in turn, adds to the overall cost of the fuel tank.

Thus, the need exists for a manufacturing process that will permit at least a portion of a highly conformal, fabric-reinforced, elastomeric fuel tank to be built using a reverse build (female) mold and self-sealing, autoclave curable materials. The fuel tank can then be completed by joining the self-sealing portion of the tank with a light weight portion made from different materials.

Significant manufacturing costs are further experienced where tank fittings must be prefabricated or premolded prior to installation within the female molds. Such tank fittings typically included fitting metals which are bonded to a separately manufactured flange material using additional molding equipment. The flange portion of the fitting, once bonded to the fitting metals as by a clamping process or the like, is then placed into the female mold, and the tank is then built on top of it. Because each fitting is manufactured separately from the tank wall itself, it will be appreciated that the thickness of the tank will practically double at each fitting location, due to the increased number of layers of material constituting the flange material.

Moreover, because the fitting metals have to remain free from any of the other materials used to manufacture the fuel tank (to ensure the fitting would be suitable for use in the cavity of the vehicle framework), it was heretofore required that the fitting metals be covered by tape or the like to prevent such other materials from contaminating the fittings. Such the accurate location of the fittings is one of the primary objects of using the reverse build process, as noted in Robinson et al. U.S. Pat. No. 4,434,021, it is seen as highly desirable to maintain the ability to accurately locate and install the tank fittings, while reducing the cost of fabricating the same.

SUMMARY OF THE INVENTION

In light of the foregoing, it is, in accordance with a first aspect of the present invention, an object to provide a method for manufacturing complex-shaped fuel tanks without resort to the use of male forms.

It is, in accordance with another aspect of the present invention, an object to provide a manufacturing method which uses a plurality of female mold sections to reverse build the complex-shaped fuel tanks, each mold section forming a portion of the fuel tank with different materials.

It is, in accordance with a further aspect of the present invention, an object to provide a manufacturing method for complex-shaped fuel tanks, as above, which uses self-sealing materials for a portion of the fuel tank.

It is, in accordance with still another aspect of the present invention, an object to provide a manufacturing method for complex-shaped fuel tanks, as above, which requires less time and is less costly than previous reverse build processes.

It is, in accordance with still a further aspect of the present invention, an object to provide a manufacturing method for complex-shaped fuel tanks, as above, which permits the manufacturer to cure the materials used to make at least part of the fuel tank structure at elevated pressure conditions, such as is generated using vacuum pressure and, in some instances, autoclave pressure.

It is, in accordance with yet another aspect of the present invention, an object to provide a manufacturing method for complex-shaped fuel tanks, as above, which allows for the accurate location of both the fitting flanges or fitting metals through the use of locating/installation means in the female mold sections.

It is, in accordance with yet a further aspect of the present invention, an object to provide a complex-shaped fuel tank which is highly conformal to the fuel cavity of the vehicle body framework.

It is, in accordance with still another aspect of the present invention, an object to provide a complex-shaped fuel tank which uses two different types of materials within separate halves of the fuel tank structure, but with can be joined with conventional air cured materials.

It is, in accordance with yet another aspect of the present invention, an object to provide a complex-shaped fuel tank, as above, which uses self-sealing materials and light weight materials for the same tank structure.

The foregoing and other aspects of the invention, which will become apparent as the detailed description proceeds, are achieved by a method for the manufacture of at least a portion of a complex-shaped, elastomeric fuel tank of the type for installation into a vehicle body cavity comprising the steps of: providing a female mold section exactly duplicating the complex contours of at least part of the vehicle body cavity into which the fuel tank will be mounted;

coating a first ply of urethane elastomer onto the female mold section; applying a plurality of layers of self-sealing material over the first ply; applying means to provide vacuum pressure to the plurality of layers; curing the plurality of layers while still in the female mold section in a means for curing at a temperature of at least 220° F. and a pressure of at least 15 psi; coating a second ply of urethane elastomer over the layers of self-sealing material so as to encase the layers of self-sealing material between the first ply and the second ply; applying a fuel-resistant film over the second ply to provide a barrier to hydrocarbon fuels; and coating a third ply of urethane elastomer onto the barrier film to provide a liner for that portion of the tank.

Other aspects of the invention which will become apparent from the description herein are attained by a method for the manufacture of a complex-shaped, elastomeric fuel tank of the type for installation into a vehicle body cavity, the fuel tank comprising an upper portion and a lower portion, the method comprising the steps of: providing complementary upper and lower female mold sections exactly duplicating the complex contours of the vehicle body cavity into which the fuel tank will be mounted; preparing the upper portion of the fuel tank using the upper female mold section, the step of preparing including the steps of: coating a first ply of urethane elastomer onto the upper female mold section; applying a plain woven fabric over the first ply to provide reinforcement to the tank; coating a second ply of urethane elastomer over the reinforcement fabric so as to encase the fabric between the first ply and the second ply; applying a fuel-resistant film over the second ply to provide a barrier to hydrocarbon fuels; and coating a third ply of urethane elastomer onto the barrier film to provide a liner for the upper portion of the tank; removing the resultant composite from the upper female mold section; applying a tear-resistant fabric to the outside of the resultant composite; applying a sealing film over the third ply; and coating a fourth ply of urethane elastomer onto the barrier film to provide an outer ply to the upper portion of the tank; and also preparing the lower portion of said fuel tank using the lower female mold section, said step of preparing including the steps of: coating a first ply of urethane elastomer onto the female mold section; applying a plurality of layers of self-sealing material over the first ply; applying means to provide vacuum pressure to the plurality of layers; curing the plurality of layers while still in the female mold section in means for curing at a temperature of at least 220° F. and a pressure of at least 15 psi; coating a second ply of urethane elastomer over the layers of self-sealing material so as to encase the layers of self-sealing material between the first ply and the second ply; applying a fuel-resistant film over the second ply to provide a barrier to hydrocarbon fuels; and coating a third ply of urethane elastomer onto the barrier film to provide a liner for that portion of the tank; joining the upper and lower portions together at their mating peripheral edges; applying reinforcement fabric and urethane elastomer to the inside of the joined portions at the interface of the peripheral edges to form a splice between the upper and lower portions; and allowing the entire tank to cure into an integral structure.

BRIEF DESCRIPTION OF THE DRAWINGS

For a complete understanding and full appreciation of the objects, techniques, features, method and structure of the invention, reference should be made to the following detailed description and accompanying drawings wherein:

FIG. 1 is a representative cross-section of a vehicle body framework defining a cavity within which a completed fuel tank may be mounted;

FIG. 2 is an elevational cross-sectional view of a representative female mold for making an elastomeric fuel tank which will exactly fit the vehicle body framework cavity of FIG. 1;

FIG. 3 is an elevational cross-sectional view of the layers of materials which form, in one embodiment, the top half of the tank structure;

PREFERRED EMBODIMENT FOR CARRYING OUT THE INVENTION

Figure 4:
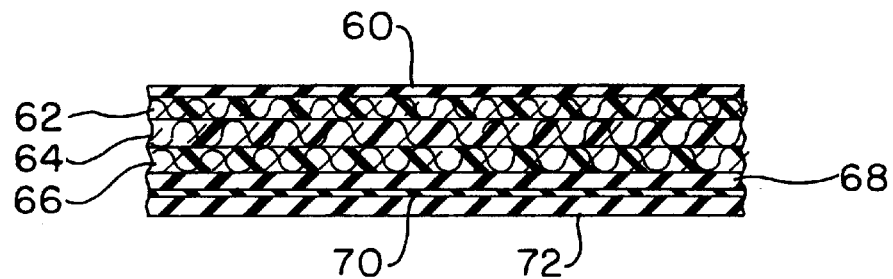
FIG. 4 is an elevational cross-sectional view of the layers of materials which form, in one embodiment, the bottom half of the tank structure.

One representative form, shown in cross-section, of a vehicle body framework is generally indicated by reference numeral 10 in FIG. 1 and would normally include various structural members (not specifically shown) which define a cavity 12 into which an elastomeric fuel tank will be mounted. It will be appreciated that the representative cross-sectional configuration of the vehicle body framework 10 and the cavity 12 defined thereby are not necessarily representative of an actual vehicle body framework or fuel tank cavity, but rather are shown for illustrative purposes only in order to show the relationship between the cavity 12 and the fuel tank to be mounted therein as detailed hereinbelow.

As noted hereinabove, practice of the present invention is directed toward the production of an elastomeric fuel tank, using a reverse build (female mold) process, which fuel tank is highly conformal to the cavity into which it will be mounted and which uses self-sealing, autoclave curable materials in at least part of the tank. Typically, such fuel tanks will be of a complex shape or configuration since the cavity or space within the vehicle into which they are mounted is generally limited and of an unusual, likewise complex, shape. It will be appreciated, however, that by the term "complex-shaped" it is meant that the fuel tank has a shape which conforms to the cavity into which it will be located. Typically, these fuel tanks will be very unusual and complicated in shape with at least a few severe curves, protrusions, or other distorted contours.

In order to produce the elastomeric fuel tanks by a reverse build process and without the use of male forms, a dimensionally accurate female mold, generally indicated by the numeral 14 in FIG. 2, is first made of the vehicle framework cavity 12 and this mold 14 is made in two parts, an upper mold section 16 and a lower mold section 18. The female mold 14 may be made according to any conventional mold making technique and should be made such that every contour and curve of the cavity 12 will be represented in the contours of the fuel tank structure when it is completed in the mold 14. Because this invention is primarily directed to fuel tanks which occupy very limited space in the body framework of, for example, a fighter aircraft and every available volume of space will be utilized for fuel storage, it will be appreciated that the dimensional accuracy of the mold sections 16,18 with respect to the cavity 12 is important to the success of these type fuel tank structures.

Moreover, it will be appreciated that the female mold 14 is not necessarily limited to one having an upper mold section 16 and lower mold section 18. Instead, the female mold 14 could have any number of mold sections suitable for production of the fuel tank structure and depending upon the need for different materials within the tank structure at various locations. In vehicles such as fighter aircraft and the like which are susceptible to anti-aircraft gunfire from below the aircraft, the need for self-sealing materials are seen as required for the lower part of the fuel tank. Accordingly, the mold sections are delineated for purposes of discussion into upper and lower sections. However, the mold sections 16 and 18 could easily be made into right and left sections, front and back sections, or any other complementary forms, depending upon the needs and requirements of the vehicle. Other than for convenience and for easy of production in removing the fuel tank sections from the mold sections, it is also not necessary that the female mold 14 be divided in half sections. The female mold sections 16,18, however, are complementary to each other and if they were to be positioned in a mating relationship about their respective peripheral edges 20,22 they would present an accurate duplication of the walls 24 defining the cavity 12.

Figure 5:
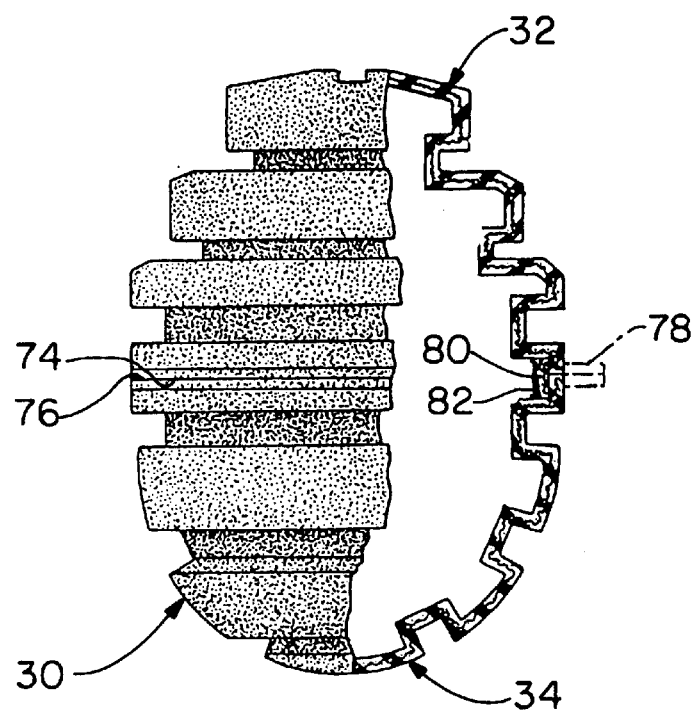
FIG. 5 is an elevational view, partially in cross section, of a representative fuel tank made in according to the present invention.

In the preferred embodiment, the fuel tank of the present invention, denoted by the numeral 30 in FIG. 5, will have an upper portion 32, formed in the upper mold section 16 which uses the same or similar light weight materials as those used in the current production of fuel tanks using a reverse build (female) process. However, in the lower portion 34 of the fuel tank 30 formed in the lower mold section 18, self-sealing, autoclave curable materials are preferably employed. Accordingly, the reverse build process steps for manufacturing the upper portion 32 of the fuel tank 30 are different from the reverse build process steps for manufacturing the lower portion 34 of the fuel tank 30. It will be appreciated that there is nothing preventing one from manufacturing the upper portion 32 of the fuel tank 30 in the same manner as the lower portion 34, as detailed hereinbelow. However, the use of light weight materials in the upper portion 32 is seen as being more advantageous (lighter in weight) than the use of self-sealing, autoclave curable materials in that portion.

According to the preferred present process, both of the upper and lower mold sections 16,18 may first be coated with a release ply (not shown) so as to facilitate removal of the upper and lower portions 32,34 of the tank 30 from the mold sections 16,18 when completed or otherwise necessary.

At this stage, various tank flanged fittings and ferrules 36 may be assembled and installed into some means located in the female mold 14 for locating and positioning the flanged fittings and ferrules 36, such as at bosses or points 38 in the mold sections 16, 18 as necessary. The bosses or points 38 accurately reflect where the flanged fittings and ferrules are to be located for proper installation of the fuel tank 30 in the cavity 12 of the vehicle body framework 10 once the fuel tank 30 has been completed. These tank flanged fittings and ferrules 36 can be mounted and secured to the outside of the tank or to the next layer applied in the process using any conventional means of adhering or attaching known in the art. Typically, the fittings and ferrules 36 are adhesively secured to the underlying ply next applied in the formation of the tank structure.

It will be appreciated, however, that the fittings and ferrules could be installed, if desired, at some later stage of the process such as, for example, after applying the layer of fabric reinforcement or applying a cover coat of urethane elastomer as discussed hereinbelow. Where the installation of the fitting and ferrules takes place after the application of one or more layers, care should be taken to identify accurately the location of the bosses or points 38 in the mold sections 16,18 and to not damage or otherwise compromise the leak-proof integrity of the fabric layer or layers during such installation. Also, protection of the fitting metals is as important at this later stage as it is where the fittings are installed first. Installing the flanged fittings and ferrules 36 first (directly adjacent the mold surface) is believed to enhance the appearance of the fittings and ferrules 36 in the finished product.

Alternatively, the present process allows for the installation of only the flanged portion of the fitting 36 during the reverse build process and the installation of the fitting metals at some later stage, even after the completion of the fuel tank. If this is done, the fitting flange portion of the fittings 36 can be built directly into the tank itself so as to prevent significant increases to the thickness of the tank around the fittings, although some build-up of material can be provided. Means for identifying where the fittings are to be located, such as a boss or point 38, is still used, as above, to locate where on the fuel tank in relationship to the mold section 16 or 18 the fitting 36 is to be positioned.

It will be appreciated that the fitting metals need not be covered because they are not present during the construction of the fuel tank. Simple clamping of the fitting metals to the composite fuel tank structure at the flanged fitting sites, typically after the fuel tank has been stripped out of the female mold, completes the tank fittings.

Still further, it will be appreciated that other components required for the effective operation of the vehicle into which the completed fuel tank will be mounted can be installed at the same time as the flanged fittings and ferrules 36. For example, in fighter aircraft, baffle footers (not shown) which maintain the supply of fuel to the aircraft when it is flying upside down may be installed in the lower mold section 18.

Continuing with the formation of the upper portion 32 of the fuel tank 30 in the upper mold section 16 and with more particular reference to FIG. 3, a thin spray coat 40 of a urethane elastomer is applied to the mold section 16 and forms a first elastomeric ply. One preferred urethane elastomer is commercially available from The Goodyear Tire and Rubber Company, Akron, Ohio, and is sold under the trademark Vithane™. The Vithane elastomer is chosen so as to contain an amount of solids in solution within the range of 20–70% and preferably about 35–45%. For example, the set time at about 40% is approximately one hour and therefore sufficient time is available between applications of the various plies and for quality control purposes but is short enough to facilitate a production line type manufacturing process. The Vithane elastomer is applied at a preferred rate within the range of 0.1–0.5 gal/min dependent upon operator control and, in this instance, to a preferred thickness of up to about 6 mils and preferably to a nominal thickness of about 4 mils or less. Based upon this nominal thickness, the Vithane elastomer cover coat 40 should have a weight of about 3.6 oz/sq yd or less.

Next, a layer of fabric reinforcement 42 is placed in the mold section 16, preferably in two steps. First, a plurality of fabric patches 42a are applied to the areas in the mold section 16 that have severe and complex contours as shown in FIG. 2. It will be appreciated that, if a male mold were used, these complex contours would be recesses within the male mold section. However, since female molds are used, these complex contours are protrusions such as 44 which are more easily covered by the materials forming the composite structure than would be the recesses of a male mold. Moreover, the patches of fabric 42a may be of any size or shape which enables them to conform readily over the complex contour of the mold and are held in place by the urethane elastomeric ply 40 which was previously applied and has set sufficiently to accomplish this task.

Second, a sheet of the fabric material 42b is placed within each mold section and smoothed into place so as to follow the contours of the mold section 16. The sheet fabric 42b is cut or slit in the areas of severe contour that have been previously covered by the fabric patches 42a. The purpose of the patches of fabric 42a should now be appreciated in that they complete the fabric ply 42 in areas of the mold not capable of being covered by the sheet of fabric material 42b. Thus every contour of the mold cavity is covered by fabric reinforcement material 42 whether it be by the fabric patches 42a or by the sheet fabric material 42b.

Particularly useful and preferred fabric reinforcement materials for this application include a plain woven polyester or nylon having a weight of about 1.5 to 6.0 oz/sq yd, and even more preferably having a weight of about 3 to 5 oz/sq yd. Depending upon the weight of the fabric, the preferred fabric may vary in thickness within the range of 5–15 mils with about 8 to 12 mils being most preferred. The polyester fabric has been found to be dimensionally stable and easy to handle, and therefore, is most preferred in this embodiment.

Next, the fabric reinforcement material 42 is spray-coated with a cover ply of urethane elastomer 46, which may also be the Vithane elastomer, at a preferred rate of about 0.1 to 0.5 gals/min and to a preferred thickness within the range of about 3 to 7 mils and, more preferably, to about 4 to 6 mils. The plies 40 and 46 of urethane elastomer thus encapsulate the fabric reinforcement material 42.

After the urethane elastomer cover ply 46 is applied and has set, a spray coating of a barrier system 48 may be applied. The preferred barrier system is a nylon film or a highly cross-linked urethane specifically compounded for the specific purpose of protecting the fabric from hydrocarbon fuel which may penetrate the composite. The barrier film 48 may be applied such that it has a preferred thickness of approximately 2 mils.

Finally, yet another ply of urethane elastomer 50 is spray-coated at a preferred rate of about 0.1 to 0.5 gals/min and to a preferred thickness within the range of about 10 to 15 mils. This ply 50 serves as the inner facing or liner ply of the fuel tank 30 once completed.

In many instances, the initial cover coat of urethane elastomer 40 will serve as the outer coat for the finished fuel tank 30. However, where the fuel tank 30 is to be used in fighter aircraft and the like, an additional tear-resistant fabric 52, a optional barrier system 54 and an outer coat of urethane elastomer 56 may be applied to the outside of the tank 30.

To apply the additional tear-resistant fabric 52, the composite structure completed thus far must be stripped out of the female mold section 16 in a manner conventional to the art. The composite structure of the fuel tank 30 may then be cleaned and placed on an apparatus (not shown) suitable for handling the application of the tear-resistant fabric to the outside of the upper portion 32 of the tank 30. The tear-resistance fabric 52, which is typically made with a leno weave construction, is made of nylon yarn and weighs approximately 3.5 oz/sq yd. The nylon fabric is a "fish net-like" cloth having excellent durability and strength which has a thickness of about 16 to 20 mils. This tear-resistant fabric serves to prevent the expansion of any tear or puncture in the fuel tank 30 in the event the tank 30 is punctured or otherwise penetrated by a foreign object such as a bullet from an anti-aircraft gun in the case where the tank is mounted in a fighter aircraft.

The tank may then be completed by, optionally, applying a sealant system or film 54 similar to the barrier system 48 previously discussed and spray coating a final coat 56 of the urethane elastomer to the outside of the tank 30 which will serve as the outer coat of material on the tank 30. This outer coat 56 of urethane elastomer (Vithane) preferably is applied at a preferred rate of about 0.1 to 0.5 gals/min to a preferred thickness of about 5 to 15 mils.

Turning to the production of the lower portion 34 of the tank 30, after the tank flanged fittings and ferrules 36 and other necessary components have been applied as discussed hereinabove, a spray coat 60 of urethane elastomer such as Vithane is applied to the lower mold section 18. This ply 60 may ultimately be the outer surface of the lower portion 34 of the completed fuel tank 30 unless another ply is applied after the lower portion 34 has been removed from the lower mold section 18. Like the outer coat of the upper portion, this coat 60 of urethane elastomer (Vithane) preferably is applied at a rate of about 0.1 to 0.5 gals/min to a thickness of about 5 to 15 mils.

The next step in the process involves the placement of the self-sealing material. The preferred material is a plain woven, natural rubber-coated nylon cloth material which is capable of sealing or, at the least, reducing the size of the hole through which fuel may flow out of the tank upon being penetrated by a object such as a bullet from an anti-aircraft gun in the case of a fighter aircraft. By effectively sealing the puncture itself and limiting the amount of fuel which might otherwise leak through the punctured hole, the self-sealing material will prevent further damage to other parts of the vehicle and may enable the pilot or other operator of the vehicle to continue his mission safely and effectively.

In the preferred embodiment, the self-sealing fabric is applied to the lower mold section 18 in three layers. The first (outermost) layer 62 is preferably thinner than the other two layers, but may have a thickness ranging from about 20 to 50 mils and weight from about 15 to 20 oz/sq yd. The second (middle) layer 64 and third (innermost) layer 66 preferably have a thickness ranging from about 30 to 50 mils and weigh about 20 to 40 oz/sq yd. It has been found that by placing the woven pattern of the second layer 64 at a 45° angle to the first and third layer, 62 and 66 respectively, the ballistic protection of the layers can be improved.

The layers of self-sealing material may then be autoclave cured. To cure the layers, means to provide vacuum pressure to the plurality of layers, such as a cure vacuum blanket, should be applied to the female mold section 18. If necessary, baffle cure blocks which prevent the vacuum blanket from collapsing the baffle footer during curing may also be used. While a cure vacuum blanket is the preferred means to provide the necessary vacuum pressure, it will be appreciated that any other means of doing this which will not deleteriously hinder or harm the fuel tank is also contemplated.

A useful cure vacuum blanket may be made from silicon rubber and provides a vacuum pressure on the layers of self-sealing materials 62,64,66. The lower mold section and the composite placed therein can then be placed in an electric oven with a vacuum system or in an autoclave or in some other conventional curing/drying means. In the preferred embodiment, instead of the normal air curing time of at least 24 hours, the layers remain in the autoclave or oven for only about 3 to 14 hours, and most preferably, for only about 4 hours. The autoclave or oven preferably is heated to a temperature ranging from about 220° F. to 250° F. at a pressure of about 15 to 90 psi.

More preferably, where an autoclave is utilized, the preferred temperature should range from about 230° F. to 250° F. with the preferred pressure being from about 55 to 65 psig. Where an electric oven is utilized, a 220° F. to 250° F. temperature range is preferred with a vacuum pressure of about 15 psig.

It will be appreciated that, because of the pressure and heat applied to self-sealing materials during the curing process, the layers conform even more to the contours of the mold section 18. In fact, it has been found that the fuel storage volume of the tank within the mold cavity increases by as much as 10% because of this curing process as compared to the storage volume of a tank which did not use this curing process. In other words, the self-sealing materials do not conform to the shape of the mold cavity as well if they are air cured.

After the curing process is complete, the composite mold is taken out of the autoclave or oven and allowed to cool. Then, a cover ply of urethane elastomer 68, which may also be the Vithane elastomer, may be applied, preferably by spraying at a preferred rate of about 0.1 to 0.5 gals/min and to a preferred thickness within the range of about 3 to 7 mils and, more preferably, to about 4 to 6 mils. The plies 60 and 68 of urethane elastomer thus encapsulate the layers 62, 64,66 of self-sealing material.

After the urethane elastomer cover ply 68 is applied and has set, a spray coating of a barrier system 70 may be applied. Like the preferred barrier system 48 used in the upper mold section 16, this barrier system is preferably a highly cross-linked urethane specifically compounded or a nylon film. The barrier serves to protect the layers of self-sealing material from hydrocarbon fuel which may penetrate the composite. The barrier film 70 may be applied such that it has a thickness of approximately 2 mils.

A final ply of urethane elastomer 50 may then be spray-coated at a preferred rate of about 0.1 to 0.5 gals/min and to a preferred thickness within the range of about 10 to 15 mils. This ply 72 serves as the innerliner or innermost ply of the fuel tank 30 once completed.

After the innerliner ply 50 has cured and as previous noted, the lower mold section 18 may be removed from the formed composite, and the composite structure may be positioned in a suitable apparatus for holding the partial tank structure. A final ply of urethane elastomer (not shown) may then be sprayed on the outside of the composite to serve as an outer coat.

Once both halves of the tank 30 have been completed, they may be joined. This entails joining the two apparatuses holding the formed tank halves. It will be appreciated that the two apparatuses may or may not be the mold sections 16 and 18 themselves. In the preferred embodiment and as discussed hereinabove, both the upper and lower portions 32,34 of the tank 30 are held by an apparatus other than the mold sections 16,18. These apparatuses should also be capable of being joined together with each other or with the compatible mold section so as to join the two halves of the tank together. Alteratively, a joining apparatus suitable of holding both sections of the tank together may be used. In any event, the apparatus or apparatuses holding the half portions of the tank should be complementary to each other around the open end of the half portions and capable of being positioned in a mating relationship about their respective peripheral edges.

Prior to joining the two portions 32,34 of the tank 30 to form the complete tank structure, the edges 74,76 of the upper and lower portions 32,34, respectively, can be buffed. The material in this area forms a butt splice of the two tank sections as illustrated at 78 in FIG. 5. An adhesive elastomer can be applied to the buffed area and the two complementary apparatuses holding the half portions of the tank are joined at their peripheral edges and clamped. Where a baffle footer is provided, it can also be joined to the upper portion 32 of the tank 30 at this time.

To complete splicing together of the two butt-joined sections of the tank, access is gained into the interior of the tank through the fittings 36 or through an access port provided by this purpose. A splice is made by laying in a width of reinforcement fabric 80 sufficient to lap the butt-joined upper and lower tank sections 32,34 and then brushing additional urethane elastomer 82 thereover to seal the fabric.

The composite forming the tank structure 30 is preferably allowed to cure for at least 24 hours before removing the completed tank 30 from the mold sections 16,18 or other apparatus. Once removed, however, the tank 30 will be a single integral unit.

Finally, any excess material forming the splice such as illustrated in ghost lines at 78 may be cut off or trimmed so as not to interfere when the tank is mounted in the vehicle cavity 12 and the tear-resistant fabric 52 applied to the upper portion 32 of the tank 30 may further be applied down to the edge of the self-sealing material by means disclosed hereinabove.

Following the process steps as described above, fuel tank structures may be made having all gauge thicknesses for the upper portion 32 within the range of about 20 to 70 mils, weights within the range of about 0.145–0.300 lbs/sq ft, while the lower portion 34 may have all gauge thicknesses within the range of about 100 to 200 mils, weights within the range of about 0.6 to 0.9 lbs/sq ft. Generally, the thicknesses and weights of each individual ply may vary by as much as 30% depending upon several factors, including the rate of application, the application technique, and the material employed, to name a few.

In order to demonstrate practice of the present invention, a particular tank made according to the described process was constructed and had an upper portion constructed comprising 10 mils urethane outer ply, 18 mils non-tear fabric, 4 mils urethane cover coat ply, 11 mils fabric, 6 mils urethane intermediate ply, 2 mils barrier, and 12 mils urethane innerliner ply. A nominal total thickness of 63 mils was achieved at a nominal weight of 0.263 lbs/sq ft. The lower portion comprised 10 mils urethane outer ply, 32 mils of a first self-sealing layer, 44 mils of a second self-sealing layer (laid at a 45° angle to the other layers), 44 mils of a third self-sealing layer, 6 mils urethane intermediate ply, 2 mils barrier, and 12 mils urethane innerliner ply. A nominal total thickness of 150 mils was achieved at a nominal weight of 0.740 lbs/sq ft. Some components, such as ferrules and baffle footers were omitted for the test tank.

The tank portions, once joined, were cured at ambient temperature for at least 24 hours. While joining of the portions to complete the tank may be cured at ambient temperature to the extent that the structure may be removed from the molds or other apparatuses after about 24 hours, it is preferable that the cure be extended to about 48 hours. It will, of course, also be recognized by those skilled in the art that the cure time of some of the component plies may be accelerated by increasing the drying temperature to some extent, and in this respect, it was found that the Vithane elastomer may be exposed to a temperature within the range of about 120° F. to 160° F. The fabric reinforcement material were cured most easily at ambient temperature, while the self-sealing materials/layers were cured in an autoclave for 4 hours, at 240° F. and 60 psi on vacuum.

The shear strength and peel strength of the resultant autoclave-cured lower portion was tested both with and without vacuum pressure. Table I hereinbelow shows the results of these tests.

TABLE I

SEAM STRENGTH TEST

| Self-seal Autoclave Sample with Vacuum | Self-seal Autoclave Sample without Vacuum |
|---|---|
| Shear Strength = 142 lbs/in | Shear Strength = 83 lbs/in |
| Peel Strength = 10 lbs/in | Peel Strength = 3.5 lbs/in |

Next, transition strength tests were conducted on an F-18 Tank transition sample and an F-15 Tank transition sample. Seam strength and peel strength results of these samples were as follows.

TABLE II

TRANSITION STRENGTH TEST

| F-18 Tank Transition Sample | F-15 Tank Transition Sample |
|---|---|
| Shear Strength = 206 lbs/in | Shear Strength = 100 lbs/in |
| Peel Strength = 26 lbs/in | Peel Strength = 3.8 lbs/in |

The resultant fuel tank was also test for leaks using phenol and passed this test. Furthermore, the tank was tested with fuel at 5 psig for 4 hour, followed by a 2.7 psig stand test for 72 hours, followed by a 30-day static stand test. The tank passed these tests as well. Thus, it should be evident that the reverse build process of the present invention is highly effective in providing a strong, light weight, elastomeric fuel tank using self-sealing, autoclave curable materials for one portion of the tank and fabric reinforcement materials for another portion of the tank. The invention is particularly suited for use in fighter aircraft, but is not necessarily limited thereto.

From the foregoing description, it must now be appreciated that the invention provides a much simpler and less costly manufacturing process than heretofore practiced by the elimination of the male form and by the ability to cure certain of the layers in an autoclave. Furthermore, and because the tank is made in a female mold and the outside ply is against the mold cavity, the finished tank has a better appearance than previously made tanks and the structure fits more closely the complex contours of the cavity into which it is to be used. Still further, and because at least a portion of the tank is made of self-sealing materials, the finished tank has improved ballistic protection than tanks previously built using the reverse build process.

Based upon the foregoing disclosure, it should now be apparent that the objects of the present invention have been satisfied by the structure and method presented hereinabove and that the use of the process and components described herein will carry out the objects as well. While, in accordance with the patent statutes, only the best mode and preferred embodiment of the invention has been presented and described in detail, it is to be understood that any variations evident fall within the scope of the claimed invention and thus, the selection of specific component elements can be determined without departing from the spirit of the invention herein disclosed and described. For example, while the urethane elastomer is preferably spray-coated on the mold sections to form the various plies, it should be appreciated that such elastomer could have been applied by brushing it onto the mold sections. Accordingly, the scope of the invention shall include all modifications and variations that may fall within the scope of the attached claims.

What is claimed is:

1. A method for manufacturing at least a portion of a complex-shaped, elastomeric fuel tank for installation into a vehicle body cavity, comprising the steps of:

providing a female mold section exactly duplicating a plurality of complex contours of at least part of the vehicle body cavity into which the fuel tank will be mounted;

coating a first ply of urethane elastomer onto the female mold section;

applying a plurality of layers of self-sealing material over the first ply in the female mold section;

applying vacuum pressure to the plurality of layers;

curing the plurality of layers while still in the female mold section at a temperature of at least 220° F. and a pressure of at least 15 psi;

coating a second ply of urethane elastomer over the plurality of layers of self-sealing material to encase the plurality of layers of self-sealing material between the first ply and the second ply;

applying a fuel-resistant film over the second ply after the plurality of layers have been cured to provide a barrier to hydrocarbon fuels;

coating a third ply of urethane elastomer onto the fuel-resistant film to form a liner; and removing the first ply from the female mold section after forming the liner, thereby forming said at least a portion of the fuel tank.

2. The method according to claim 1, further comprising the step of applying a ply of release material to an inner surface of said female mold section before applying the first ply of urethane elastomer.

3. The method according to claim 1, wherein the female mold section includes means for locating and mounting tank flanged fittings, and further comprising the steps of installing at least one tank flanged fitting on at least one of the means for locating and mounting and subsequently attaching the at least one tank flanged fitting to the at least a portion of the fuel tank formed.

4. The method according to claim 1, wherein the at least a portion of the fuel tank has tank fittings comprising fitting flange material and fitting metals, wherein the female mold section has means for identifying where the tank fittings are to be located, and further comprising the steps of installing the fitting flange material on the means for identifying during said method for manufacturing and installing the fitting metals on the fitting flange material after said method for manufacturing.

5. The method according to claim 1, wherein the step of coating the first ply of urethane elastomer includes the step of spraying the first ply into the female mold section; wherein the step of coating the second ply of urethane elastomer includes the step of spraying the second ply over the plurality of layers, and wherein the step of coating the third ply of urethane elastomer includes the step of spraying the third ply onto the fuel-resistant film.

6. The method according to claim 1, wherein said step of applying a plurality of layers includes applying a first layer, a second layer, and a third layer, each of the first layer, the second layer and the third layer comprising a plain woven, rubber-coated nylon cloth material, the woven cloth material of the second layer being placed at a 45° angle to the first layer and the third layer to provide improved ballistic protection.

7. The method according to claim 6, wherein the first layer is thinner than the second and third layers.

8. The method according to claim 7, wherein the first layer has a thickness ranging from about 20 mils to 50 mils and weighs from about 15 oz/sq yd to 20 oz/sq yd, and the second and third layers each have a thickness ranging from about 30 mils to 50 mils and each weighs about 20 oz/sq yd to 40 oz/sq yd.

9. The method according to claim 1, wherein the step of applying vacuum pressure includes using a cure vacuum blanket.

10. The method according to claim 1, wherein the step of curing includes curing the plurality of layers for 3 hours to 14 hours at a temperature of 220° F. to 250° F. and a pressure of 15 psi to 90 psi.

11. The method according to claim 10, wherein the step of curing includes curing in an autoclave, the plurality of layers being cured therein for 3 hours to 6 hours at a temperature of about 230° F. to 250° F. and a pressure of about 55 psi to 65 psi.

12. The method according to claim 10, wherein the step of curing includes curing in an electric oven at a pressure of 15 psi.

13. A method for manufacturing a complex-shaped, elastomeric fuel tank for installation into a vehicle body cavity, the fuel tank comprising an upper portion and a lower portion, the upper and lower portions having complementary mating peripheral edges, the method comprising the steps of:

provinding an upper female mold section and a lower female mold section, the upper and lower female mold sections exactly duplicating a plurality of complex contours of an upper portion and a lower portion, respectively, of the vehicle body cavity into which the fuel tank will be mounted;

forming the upper portion of said fuel tank using the upper female mold section, said step of forming including the steps of:

coating a first ply of urethane elastomer onto the upper female mold section;

applying a woven fabric over the first ply;

coating a second ply of urethane elastomer over the woven fabric to encase the fabric between the first ply and the second ply;

applying a first fuel-resistant film over the second ply to provide a first barrier to hydrocarbon fuels;

coating a third ply of urethane elastomer onto the first fuel-resistant film to provide a first liner for the upper portion of the fuel tank;

subsequently removing the first ply from the upper female mold section, thereby forming a composite defining the upper portion of the fuel tank;

applying a tear-resistant fabric to a side of the first ply previously contacting the upper female mold section;

applying a second fuel-resistant film over the tear-resistant fabric to provide a second barrier to hydrocarbon fuels; and coating a fourth ply of urethane elastomer onto the second fuel-resistant film to provide an outer ply to the upper portion of the tank;

preparing the lower portion of said fuel tank using the lower female mold section, said step of preparing including the steps of:

coating a fifth ply of urethane elastomer onto the lower female mold section;

applying a plurality of layers of self-sealing material over the fifth ply in the lower female mold section;

applying vacuum pressure to the plurality of layers;

curing the plurality of layers while still in the lower female mold section at a temperature of at least 220° F. and a pressure of at least 15 psi;

coating a sixth ply of urethane elastomer over the plurality of layers of self-sealing material to encase the plurality of layers of self-sealing material between the fifth ply and the sixth ply;

applying a third fuel-resistant film over the sixth ply after the plurality of layers have been cured to provide a third barrier to hydrocarbon fuels; and coating a seventh ply of urethane elastomer onto the third fuel-resistant film to provide a second liner for the lower portion of the fuel tank; and subsequently removing the fifth ply from the lower female mold section, thereby forming a second composite defining the lower portion of the fuel tank having peripheral edges;

joining peripheral edges of the upper portion of the fuel tank with the peripheral edges of the lower portion of the fuel tank to form the fuel tank;

applying at least one additional woven fabric and at least one additional ply of urethane elastomer to an interface of the joined peripheral edges within the fuel tank to form a splice between the upper and lower portions of the fuel tank; and allowing the fuel tank to cure.

14. The method according to claim 13, further comprising the steps of applying a first ply of release material to an inner surface of the upper female mold section before applying the first ply of urethane elastomer to the upper female mold section; and applying a second ply of release material to an inner surface of the lower female mold section before applying the fifth ply of urethane elastomer to the lower female mold section.

15. The method according to claim 13, wherein the upper and lower female mold sections include means for locating and mounting tank flanged fittings, and further comprising the steps of installing at least one tank flanged fitting on the means for locating and mounting and subsequently attaching the tank flanged fitting to the fuel tank to be formed.

16. The method according to claim 13, wherein the fuel tank has tank fittings comprising fitting flange material and fitting metals, wherein the upper and lower female mold sections have means for identifying where the tank fittings are to be located, and further comprising the step of installing the fitting flange material on the means for identifying during the main practicing process, and the step of installing the fitting metals on the fitting flange material after the manufacturing process.

17. The method according to claim 13, wherein each said step of coating a ply of urethane elastomer includes spraying the urethane elastomer to form each said ply.

18. The method according to claim 13, wherein said step of applying a plurality of layers in the lower female mold section includes applying a first layer, a second layer, and a third layer, each of the first layer, the second layer and the third layer comprising a plain woven, rubber-coated nylon cloth material, the woven cloth material of the second layer being placed at a 45° angle to the first layer and the third layer to provide improved ballistic protection.

19. The method according to claim 18, wherein the first layer is thinner than the second and third layers.

20. The method according to claim 19, wherein the first layer has a thickness ranging from about 20 mils to 50 mils and weighs from about 15 oz/sq yd to 20 oz/sq yd, and the second and third layers each have a thickness ranging from about 30 mils to 50 mils and each weighs from about 20 oz/sq yd to 40 oz/sq yd.

21. The method according to claim 13, wherein the step of applying vacuum pressure includes using a cure vacuum blanket.

22. The method according to claim 13, wherein the step of curing includes curing the plurality of layers for 3 hours to 14 hours at a temperature of 220° F. to 250° F. and a pressure of 15 psi to 90 psi.

23. The method according to claim 13, wherein the step of curing includes curing in an autoclave, the plurality of layers being cured therein for 3 hours to 6 hours at a temperature of about 230° F. to 250° F. and a pressure of about 55 psi to 65 psi.

24. The method according to claim 13, wherein the step of curing includes curing in an electric oven, the plurality of layers being cured therein for up to 14 hours at a temperature of 220° F. to 250° F. and a pressure of 15 psi.

* * * * *

UNITED STATES PATENT AND TRADEMARK OFFICE
CERTIFICATE OF CORRECTION

PATENT NO : 5,961,764
DATED : October 5, 1999
INVENTOR(S): Sydow et al.

It is certified that error appears in the above-identified patent and that said Letters Patent is hereby corrected as shown below:

Column 16, line 54, "main practicing" should be --manufacturing--

Signed and Sealed this

Twenty-seventh Day of February, 2001

Attest:

NICHOLAS P. GODICI

Attesting Officer     Acting Director of the United States Patent and Trademark Office